United States Patent [19]
Finkel et al.

[11] Patent Number: 5,808,233
[45] Date of Patent: Sep. 15, 1998

[54] AMORPHOUS-CRYSTALLINE THERMOCOUPLE AND METHODS OF ITS MANUFACTURE

[75] Inventors: Mikhail V. Finkel, Philadelphia; Jim J. S. Chen, Dresher; Antonio M. Goncalves, Elkins Park, all of Pa.

[73] Assignee: Temple University-Of The Commonwealth System of Higher Education, Philadelphia, Pa.

[21] Appl. No.: 680,040

[22] Filed: Jul. 15, 1996

Related U.S. Application Data

[63] Continuation-in-part of Ser. No. 613,373, Mar. 11, 1996.

[51] Int. Cl.⁶ .......................... H01L 35/12; H01L 35/34; C22F 1/00
[52] U.S. Cl. .......................... 136/200; 136/201; 136/227; 136/236.1; 148/595; 148/639; 148/644; 164/423; 164/463; 374/179
[58] Field of Search ..................... 136/200, 201, 136/224, 225, 227, 236.1; 62/3.2; 148/595, 639, 644; 374/179; 164/463, 423

[56] References Cited

U.S. PATENT DOCUMENTS

| | | | |
|---|---|---|---|
| 885,430 | 4/1908 | Bristol | 136/239 |
| 2,402,663 | 6/1946 | Ohl | 62/3.2 |
| 2,407,678 | 9/1946 | Ohl | 136/204 |
| 2,537,255 | 1/1951 | Brattain | 136/258 |
| 2,993,340 | 7/1961 | Sheckler | 62/3.2 |
| 3,530,008 | 9/1970 | Samoilovich et al. | 136/236.1 |
| 3,652,346 | 3/1972 | Tomita et al. | 148/154 |
| 3,669,762 | 6/1972 | Takeo et al. | 148/18 |
| 3,763,468 | 10/1973 | Ovshinsky et al. | 340/166 EL |
| 3,771,026 | 11/1973 | Asai et al. | 317/234 R |
| 3,785,875 | 1/1974 | Pilat et al. | 136/205 |
| 3,900,603 | 8/1975 | Rittmayer et al. | 427/124 |
| 3,920,480 | 11/1975 | Anatychuk et al. | 136/205 |
| 3,926,682 | 12/1975 | Shimada et al. | 437/247 |

(List continued on next page.)

FOREIGN PATENT DOCUMENTS

| | | | |
|---|---|---|---|
| 57-67140 | 4/1982 | Japan | 164/463 |
| 961301 | 6/1964 | United Kingdom | 136/204 |

OTHER PUBLICATIONS

Johnathan W. Valvano, "Temperature Measurements" (Advances in Heat Transfer 23: (1992)) Ed. Academic Press, Inc., pp. 357–437, No month available.

Gustavsson et al., "Thermal Conductivity, Thermal Diffusivity, and Specific Heat of Thin Samples from Transient Measurements with Hot Disk Sensors" (Rev. Sci. Instrum. 65 (12), pp. 3856–3859, Dec. 1994.

Gatowski et al., "An Experimental Investigation of Surface Thermometry and Heat Flux" (Experimental Thermal and Fluid Science, (1989)), pp. 280–292, No month available.

Cahn, R.W., "Background to Rapid Solidification Processing" (Rapidly Solidified Alloys, Chap. 1 pp. 1–10, Edited by Howard H. Liebermann (1993)), No month available.

(List continued on next page.)

*Primary Examiner*—Kathryn L. Gorgos
*Assistant Examiner*—Chrisman D. Carroll
*Attorney, Agent, or Firm*—Ratner & Prestia

[57] ABSTRACT

A thermocouple formed of a length of a single composition having first solid phase section adjoining a second solid phase section, and a transition therebetween. One method of making such thermocouples is to raise the temperature of the first solid phase section above its transformation temperature while maintaining the temperature of a second adjoining solid phase section of the length of material below its transformation temperature. A second method includes rapidly solidifying a molten material by contacting it with a moving substrate formed of adjoining regions of differing thermal conductivity. A third method includes rapidly solidifying a molten material by alternatingly contacting it with a cooling fluid and air. A fourth method includes transforming a section of a length of material in a first solid to a second solid phase by mechanical means.

9 Claims, 5 Drawing Sheets

U.S. PATENT DOCUMENTS

| | | |
|---|---|---|
| 4,292,461 | 9/1981 | Hovel ........................................ 136/249 |
| 4,496,788 | 1/1985 | Hamakawa et al. ..................... 136/249 |
| 4,557,765 | 12/1985 | Mori et al. .............................. 148/561 |
| 4,564,395 | 1/1986 | Mori et al. .............................. 148/561 |
| 4,650,618 | 3/1987 | Heinemann .............................. 264/22 |
| 4,650,920 | 3/1987 | Redick .................................... 136/239 |
| 4,776,383 | 10/1988 | Heinemann et al. ................... 164/423 |
| 4,923,524 | 5/1990 | Kiss ........................................ 136/250 |
| 4,954,856 | 9/1990 | Yamazaki ................................. 357/30 |
| 5,240,066 | 8/1993 | Gorynin et al. ........................ 164/461 |
| 5,356,485 | 10/1994 | Kreider .................................. 136/225 |

OTHER PUBLICATIONS

Hagiwara and Inoue, "Production Techniques of Alloy Wires by Rapid Solidification" (Rapidly Solidified Alloys, Chap. 6, pp. 139, 141, and 142, Edited by Howard H. Liebermann (1993)), No month available.

English Abstract of Japanese Patent Publication No. 6077008A (Mar. 18, 1994).

English Abstract of Japanese Patent Publication No. 59107501A (Jun. 21, 1984).

English Abstract of Japanese Patent Publication No. 5179410A (Jul. 20,1993).

Unverified English Translation and Russian Language copy of B.G. Livshie et al., "Physical Properties of Metalls and Alloys," 2nd Edition, Moscow, Russia, Metallurgiya, pp. 233–243 (1980), No month available.

Finkel, M.V., "Electrical Resistivity of the Boundary Zone Between Amorphous and Crystalline Regions in Certain Alloys," 1984 American Institute of Physics, pp. 891–892 Oct. 1983.

Abstract of "Thermo EMF in Amorphous Ferromagnetic Alloys," Areenueva, A.D., et al., vol. 46, Issue 3; pp. 67–73 (1991), No month available.

Abstract of "Effect of Substructure on the Thermoelectric Power of Deformed Zr–Cr–Fe Steel," Xi–Chen Sun et al., vol. 30, Issue 2; pp. 99–105 Mar. 1993.

Abstract of "Thermoelectric Power of Melt–Quenched Zr–Ni and Hf–Ni Alloys Around 90 at % Ni," Toth, J. et al., vol. 24, Issue 5; pp. 379–384, Nov. 1993.

Abstract of"Thermoelectric Power of Amorphous Ce Cu Alloys," Sakurai, et al., Conference of In, International Strongly Correlated Electron Systems, vol. 186–188, pp. 569–570, May 1993.

Abstract of "Study of the Microstructural Evolution of Alpha–Quenched or Cold–Rolled Zirconium Alloys," Merle, P. et al., Journal of Nuclear Materials, vol. 208, Issues 1–2; pp. 135–143 Jan. 1994.

Copy of the International Search Report dated Jul. 24, 1997.

AMORPHOUS-CRYSTALLINE THERMOCOUPLE AND METHODS OF ITS MANUFACTURE

CROSS REFERENCE TO RELATED APPLICATIONS

This application is a continuation-in-part of pending U.S. patent application Ser. No. 08/613,373, filed Mar. 11, 1996.

BACKGROUND OF THE INVENTION

The invention relates to a thermocouple formed from a single composition and to methods of making such thermocouples.

Conventional thermocouple devices are typically constructed by joining two lengths of wire, ribbon, film, rod or the like together. Length 2 to (as shown in FIG. 1) comprises one composition and length 4 comprises a different composition. Lengths 2 and 4 are typically comprised of pure metals, such as platinum, rhodium, nickel, copper, iron, or alloys thereof or other conductive materials such as carbon. One length of material A and one length of material B are joined together, typically by welding, mechanical means or the like, to form a junction. The junction is used to measure the temperature of a medium. Thermocouple devices function due to the Seebeck Effect which is caused by the difference in the energy distributions of the thermally energized electrons in each length of material. The different energy distributions create a voltage difference across the junction, the net effect of which is measured at the distal ends of lengths 2 and 4 and varies with the temperature of the junction. This is the "Seebeck Effect."

Prior art thermocouples are generally formed from two materials of different chemical compositions. Occasionally, two mechanically joined lengths of material of a single chemical composition in two different crystalline phases have been used to form a thermocouple. Such an arrangement is shown in a Russian reference entitled "Physical Properties of Metals and Alloys," Moscow, Russia Metallurgiya, pp. 233–243 (2nd Edition 1980), which is incorporated herein by reference.

For present purposes, the term "thermocouple" refers to a thermocouple transition, and the dissimilar materials extending from that transition on either side thereof.

SUMMARY OF THE INVENTION

The thermocouple of the present invention comprises a single length of material having two sections in two different solid phases. The thermocouple exhibits a Seebeck Effect. In one embodiment, such thermocouples of the present invention comprise a length of metallic alloy or other conductive material of a single chemical composition throughout its length, but including an amorphous section and an adjoining crystalline section, with an amorphous-crystalline transition therebetween.

Thermocouples of the present invention may be made using any general method of manufacturing that will produce from a single chemical composition a thermocouple having a first solid phase section and a second solid phase section and a transition therebetween. For example, one method of forming the thermocouples of the present invention includes transforming one section of a length of an initially amorphous or crystalline material of a single composition in the form of wire, ribbon, film, rod, or the like into a different solid phase. Where initially amorphous, a section of the length of material can be transformed into a crystalline state, or where initially crystalline the material may be transformed into a different crystalline phase. Transformation may be brought about by raising the temperature of a section of a length of material while the remainder of the length of material is maintained below the transformation temperature.

A second method of forming the thermocouples of the present invention includes rapidly solidifying a melted material of a single composition in a melt-spinning process. In this method, a rotating substrate formed of adjoining low and high thermal conductivity regions is brought into contact with a melted composition. The length is rapidly solidified but at different rates by its contact with the low and high thermal conductivity sections of the rotating substrate as the substrate is cooled.

A third method of forming the thermocouples of the present invention includes rapidly solidifying a melted material of a single composition by continuously causing the melted material alternately to contact a stream of liquid coolant and air surrounding the stream of liquid coolant. The melted material is solidified at different rates by alternately contacting the liquid coolant stream and air.

A fourth method of forming the thermocouples of the present invention includes supplying a length of material of a single chemical composition which is in a first solid phase. A first section of the length is then transformed by mechanical means to a second solid phase while maintaining a second section in the first solid phase to form a transition between the first and second phases. The transition is capable of experiencing a Seebeck Effect.

In all of the above methods, the material must be selected such that it can exist in at least two solid phases having dissimilar thermoelectric properties and when used in a thermocouple, a Seebeck Effect is experienced across the transition of the two phases. In one embodiment, the material exists simultaneously in both the amorphous and crystalline states and conduct electric current. In another embodiment, the material exists in two crystalline states having dissimilar thermoelectric properties and conduct electric current.

DETAILED DESCRIPTION OF THE EMBODIMENTS

Figure 2:
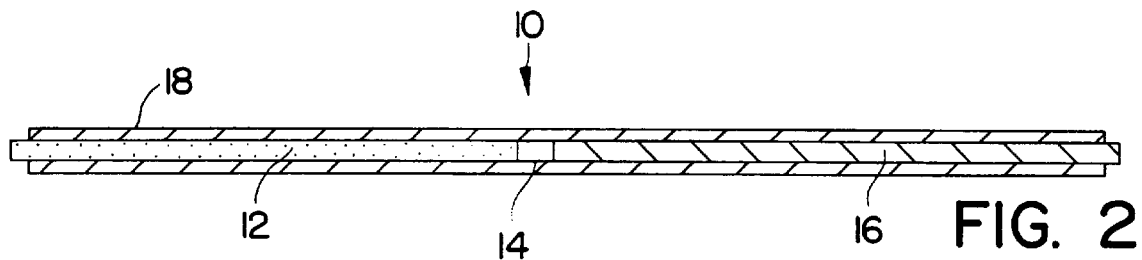
FIG. 2 is a sectional view of a thermocouple according to the present invention.

Referring in detail to the drawings, FIG. 2 shows a thermocouple 10 formed from a single composition. Thermocouple 10 includes a first solid phase section 12, a transition 14, and a second solid phase section 16.

First solid phase section 12, transition 14, and second solid phase section 16, are formed of two sections of the same material in two different solid phases, having dissimilar thermoelectric properties and having continuous transition therebetween. By "continuous transition" is meant that the two solid phases are formed from a single length of material and are not two separate materials which have been mechanically bonded, for example by welding. For example, first section 12 and second section 16 may be formed of two crystalline sections having two different crystal structures, or one crystalline and one amorphous section, so long as the two sections have dissimilar thermoelectric properties and a thermoelectric Seebeck Effect is exhibited across transition 14.

Thermocouple 10, for example, may be formed from any metal or metallic alloy composition or other conductive material by localized conversion of a section of a length of that material either from an original amorphous state to a crystalline state, leaving the remainder of the length of material in the original state, or vice versa, that is by localized conversion of a section of a crystalline length to a dissimilar crystalline state or to an amorphous state. In any event, the material must be such that it can exhibit a thermoelectric Seebeck Effect across the transition therebetween. For example, various metals, including the transition elements and alloys thereof, may be used to form the composition. The transition metals such as iron, cobalt, nickel, and alloys thereof with, for example, boron, silicon or the like, may be used. In addition, conductive non-metallic materials may be used. Also, any alloy or other conductive material such as carbon, may be used, so long as it can exist in at least two solid phases having dissimilar thermoelectric properties and the Seebeck Effect is experienced across the transition of the two phases.

As shown in FIG. 2, thermocouple 10 optionally may be coated with protective coating 18 either before or after forming the thermocouple so that it may be used in harsh environments. For example, coating 18 may be formed of a chemically resistant plastic, glass, or ceramic material.

Thermocouples 10 may have a minimum thickness or diameter in the range of 1 to 100 micrometers, but is preferably in the range of 10 to 50 micrometers, depending on the heat transfer characteristics of the alloy the method of production used. Thermocouples 10 in accordance with the present invention may also provide superior mechanical properties, such as tensile strength. In that event, they may also function as a structural component, as well as a thermocouple, thus forming, for example, a reinforcing fiber in a composite material as well as serving as a thermocouple. Similarly, to the extent such thermocouples exhibit superior physical properties, they may also be useful in that such thermocouples may not require separate leads since the materials forming the thermocouples themselves may act as leads.

Figure 3:
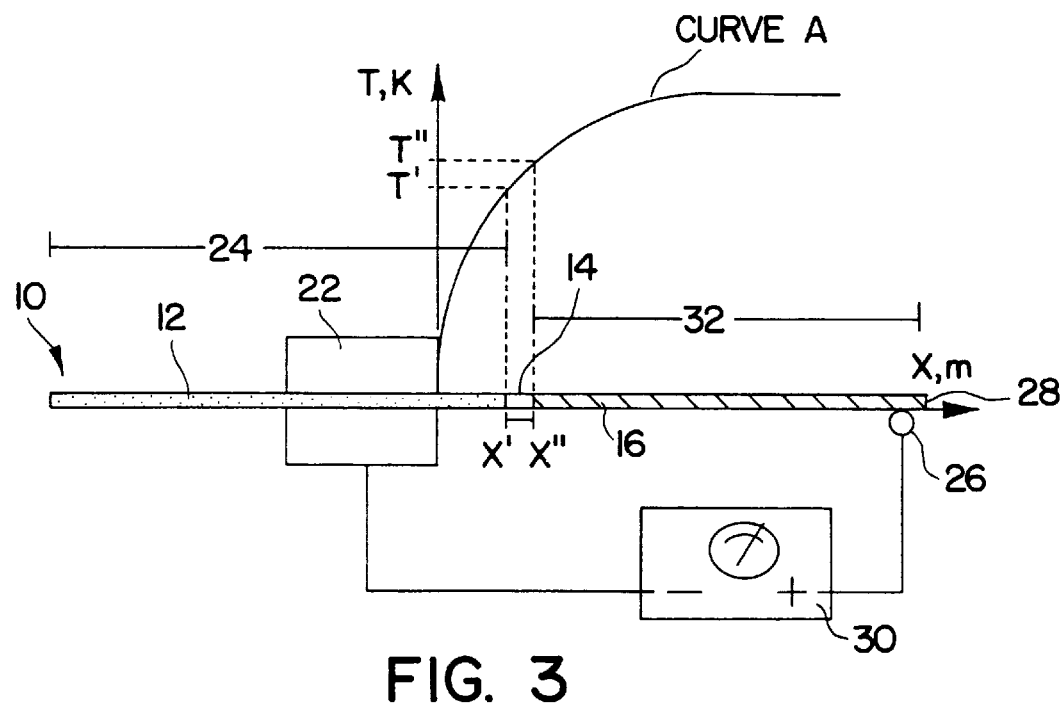
FIG. 3 is a sectional elevation view of one apparatus for making a thermocouple according to the present invention using electric current, with a thermal heating curve A superimposed thereon showing the temperature profile over a length of one part of the thermocouple during manufacture thereof.

FIG. 3 is an elevation view of an apparatus that may be used to manufacture a thermocouple 10 according to the present invention, such as that shown in FIG. 2, by starting with a length of material which is initially amorphous or crystalline and contacting it at some intermediate portion with a first electrical contact member and heat sink 22. At a distal location therefrom, the length of material is contacted with a second electrical contact member 26.

When heat sink member 22 and second contact member 26 are electrically connected to power supply 30, a voltage is applied across that length of material between the area where the length of material is in physical contact with first electrical contact and heat sink member 22 and that point at which the length of material is in contact with second electrical contact member 26. This sets up a resistive heating current therebetween, which tends to heat that section of the length of material between first electrical contact and heat sink member 22 and second electrical contact member 26. The heat sink properties of first electrical contact member 22 maintain portion 24 of the amorphous or crystalline length of material at a temperature sufficiently low such that portion 24 is frozen in its initial solid phase. Portion 32 of the initially amorphous or crystalline length of material held between the two contact elements is thereby resistively heated.

A predetermined magnitude of current for a predetermined time period is required to raise the temperature of portion 32 of the length of to the temperature which transforms portion 32 from one solid phase to another. These preselected conditions can easily be determined by one skilled in the art, and are dependent among other things on the electrical conductivity, heat of crystallization, the cross-sectional area, and thermophysical properties of the initial length of material to be converted.

Referring to curve A superimposed onto thermocouple 10 in FIG. 3, Curve A represents the temperature profile along the length of the second solid phase section 16 of thermocouple 10 during transformation of section 16 from one solid phase to another. T' is the temperature at point X' on thermocouple 10 and represents the temperature at which transformation process begins, while T" is the temperature at point X" and represents the temperature at which the transformation process ends. Beyond (to the right as shown in FIG. 3) point X", section 16 of an originally amorphous length of material is heated to a temperature above T''' and thus crystallized as described above or in the case of two-phase crystalline material, transformed from a first crystalline phase to a second crystalline phase. As also previously described, the magnitude and duration of current applied during the transformation process varies with the particular composition of the initial length of material, the rate of heat removal from the material to the first contact member 22 and to the ambient air, the thickness or diameter of the initial length of material, the resistivity of the initial length of material, and the extent to which the initial length of material is heated beyond the temperature at which the transformation process begins.

With respect to the last factor, the temperatures of crystallization, for example, of amorphous iron-based alloys, cobalt-based alloys, and nickel-based alloys may be about 720° K, 750° K, and 690° K, respectively, depending on the materials included. For these materials, where an initially amorphous composition is heated in ambient air to about 150°–250° K above its temperature of crystallization, the duration of the crystallization process could be less than one second to about 100 seconds with a current density magnitude in the range of about $1 \times 10^7$ to about $3 \times 10^7$ amperes per square meter. In this manner, complete transformation throughout portion 32 of the initial length of material results. It should be clarified that the term "transformation temperature" refers to the temperature at which the subject material changes from one solid phase to another. This temperature will vary from material to material and will depend on the phases selected. In the case of an amorphous to crystalline transformation, the transformation temperature is also the crystallization temperature.

Figure 4:
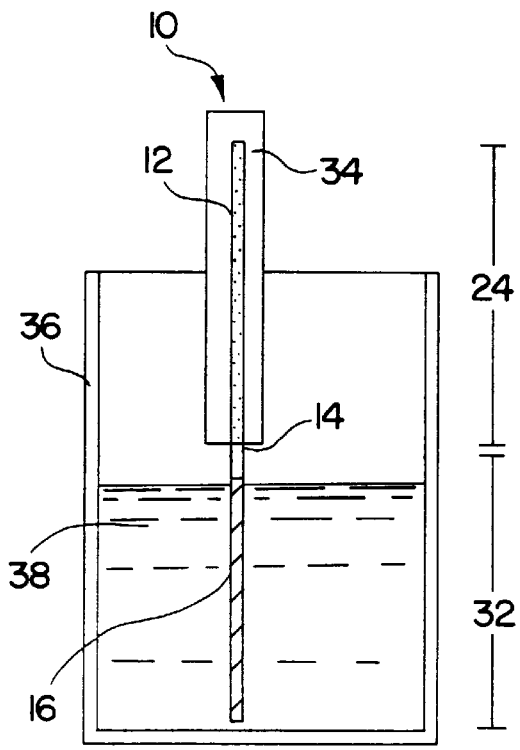
FIG. 4 is a sectional elevation view of a second apparatus for making a thermocouple according to the present invention using an external temperature field.

FIG. 4 is a sectional elevation view of a second apparatus that may be used to manufacture thermocouple 10 according to the present invention by heat treatment in an external temperature field. Thermocouple 10 initially is a homogenous, single phase amorphous or crystalline length of wire, ribbon, film or rod conductive material. Optionally, the homogeneous single phase amorphous or crystalline ribbon initially may have glass, plastic, ceramic or the like coating 18 as shown in FIG. 2. Portion 32 of thermocouple 10 is placed into bath 36 containing a molten material 38, such as glass, ceramic, metal, or plastic. Where metal is used, any residual thereof adhering to thermocouple 10 must be removed from thermocouple 10 prior to use. The temperature of molten material 38 must be high enough to transform the single solid phase section 16 to a second, different solid phase. Meanwhile, heat sink 34 in intimate thermal contact with that part of thermocouple 10 above bath 38 maintains the temperature of portion 24 below the transformation temperature of the amorphous or crystalline length of material. Heat sink 34 may be formed of any material having high heat capacity and high heat transfer coefficient. Copper and steel are typical of this type of material.

The duration for which portion 32 of the initially amorphous or crystalline length of material is kept in molten material 38 has to be long enough to transform portion 32 to a second solid phase. This duration varies with the particular chemical composition of the initial length of material, the heat removal capacity of heat sink 34, the thickness or diameter of the length of material to be transformed and the extent to which portion 32 of the length material is heated above the transformation temperature of the material. All of these variables are easily determinable by one skilled in the art.

With respect to the last factor, if the object is to heat the amorphous length of material to, for example, 200 Kelvin degrees above its temperature of crystallization with a bath at about that temperature, if the thickness or diameter of the length of material is in the range of about 1 to 100 micrometers it would likely take on the order of, for example, 1 to 10 seconds immersion in the bath to do so. The time period of crystallization may be less than one second or greater than 10 seconds, depending, among other factors, on the composition of the amorphous material and the thickness or diameter of the amorphous material.

In one embodiment of this method of manufacture, the heating of portion 32 may be accomplished by contacting portion 32 with molten glass, ceramic, plastic, heated salt or the like, which, in the course of heating thermocouple 10, also coats the thermocouple (except for salt) so as to provide protective coating 18 thereon, as shown in FIG. 2. Such a protective coating may facilitate use of thermocouple 10 in harsh environments or to physically protect the surface thereof. Where the length of material is not initially coated with protective coating 18, a similar coating process is used to coat the remaining portion 24 of thermocouple 10, so long as care is taken in the course of that coating process not to raise the temperature of portion 24 above its transformation temperature at which portion 24 transforms to a material state different from the initial material state.

In the embodiments, shown in FIGS. 3 and 4, and described with respect thereto, where the thermocouple is formed by transforming a portion of an initially amorphous length of material to a crystalline state, the crystalline portion of the thermocouple may have to be quenched to prevent the material from reverting to an undesired crystalline state if the desired crystalline state is thermodynamically unstable. Similarly, where the thermocouple is formed by transforming a portion of an initially crystalline length of material into a second crystalline state, one state is likely to be unstable, and that portion in the unstable crystalline state may have to be quenched to prevent that portion from reverting to an undesired crystalline state.

Figure 5:
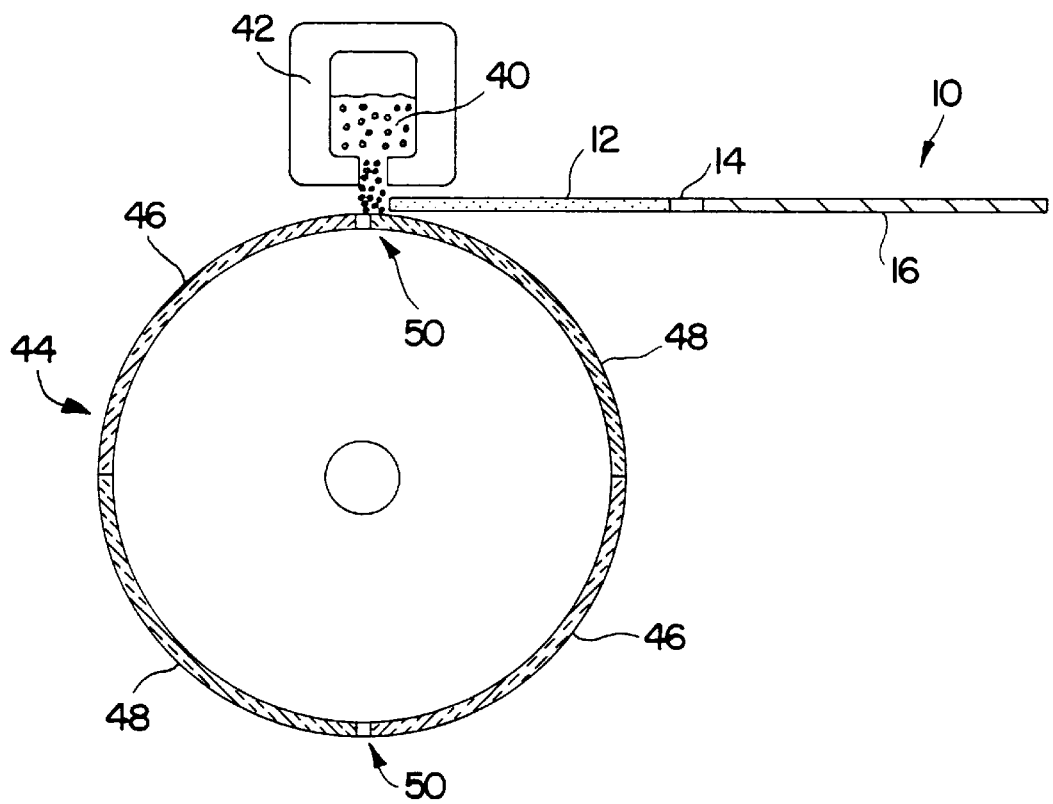
FIG. 5 is a cross-sectional elevation view of a third apparatus for making a thermocouple according to the present invention by rapidly solidifying a melted composition in a melt spinning process having adjoining regions of high and low thermal conductivity.

FIG. 5 is a cross-sectional elevation view of still another apparatus that may be used to manufacture thermocouple 10 according to the present invention by rapidly solidifying a melted composition in a melt spinning process. Molten material 40 held in crucible 42 is supplied to wheel 44, formed of alternating regions of differing first and second thermal conductivity 48 and 46, respectively, on the outside circumference or perimeter of wheel 44. Optionally, regions 46 and 48 may be formed on the inner circumference, that is, on the inside of the perimeter of wheel 44 or on the flat face of wheel 44 parallel to the plane of the page. Regions 46 and 48 are comprised, for example, of materials selected by virtue of their respective heat transfer properties to cause cooling without crystallization of molten material 40 on first thermal conductivity regions 48 and cooling with crystallization of molten material 40 on second thermal conductivity regions 46.

Where the thermal conductivity regions have high thermal conductivity, the molten material will cool into an amorphous state, and where the thermal conductivity regions have low thermal conductivity, the molten material will cool into a crystalline state. Optionally, regions 46 and 48 are comprised of materials selected by virtue of their respective heat transfer properties to cause cooling with crystallization of molten material 40 to one crystallized state (characterized by one set of thermoelectric properties) on second thermal conductivity regions 46, and cooling with crystallization of molten material 40 to another crystallized state (characterized by another set of thermoelectric properties) on first thermal conductivity regions 48.

These regions 46 and 48 are selected to provide appropriate cooling such that molten material 40 will solidify into two different solid phases upon contact therewith. Those phases may be amorphous and crystalline or may be two different crystalline phases. The phases could even be two partially crystalline phases, if the phases are sufficiently different to experience a Seebeck Effect across the transition of the phases.

Gaps 50 are formed of a thermal insulation material, a physical separation between first thermal conductivity region 48 and second thermal conductivity region 46, by varying the heights of every other second thermal conductivity region 46 and first thermal conductivity region 48 or by any other configuration that provides a break in continuity between second thermal conductivity region 46 and first thermal conductivity region 48 and allows the individual thermocouples to be separated. Gaps 50 allow thermocouple 10 to be easily separated and removed from spinning wheel 44 by centrifugal force. Where regions 46 and 48 are on the inside circumference of wheel 44, a scraping device may be used to remove thermocouple 10 from wheel 44.

As wheel 44 is rotated, molten material 40 is deposited thereon. The rotation of wheel 44 causes molten material 40 to cool and rapidly solidify in a ribbon successively forming first solid phase sections 12 on first thermal conductivity regions 48 and second solid phase sections 16 on second thermal conductivity regions 46, with transitions 14 therebetween. Optionally, wheel 44 and molten material 40 thereon may be cooled by a coolant, for example, cooled water, ethylene glycol, liquid nitrogen or other fluid cooling agent, circulating either internally or externally to wheel 44, depending on whether the thermocouples will be formed externally or internally. Since molten material 40 does not solidify at gaps 50, thermocouples 10 are individually formed and easily removed from wheel 44 by centrifugal force before thermocouple 10 completes one revolution around wheel 44. Transitions 14 function as the hot junction.

Typically, to produce the thermocouple 10 having a thickness or a diameter in the range of about 1 to 100 micrometers, the time to cool and solidify molten material 40 takes a fraction of a second, for example 0.001 seconds or less for a thermocouple having a thickness or diameter of 20–100 micrometers when wheel 44 is rotating at a velocity of 5–50 meters per second, preferably 20–30 meters per second. Under these conditions, the solidification process is generally completed when the molten material is in contact with wheel 44 for a distance of about 1–50 millimeters. Centrifugal force then causes thermocouple 10 to detach from wheel 44 before thermocouple 10 completes one revolution around wheel 44. In this manner, it is anticipated that thermocouples collectively totaling up to 20–30 meters in length can be produced every second.

Figure 6:
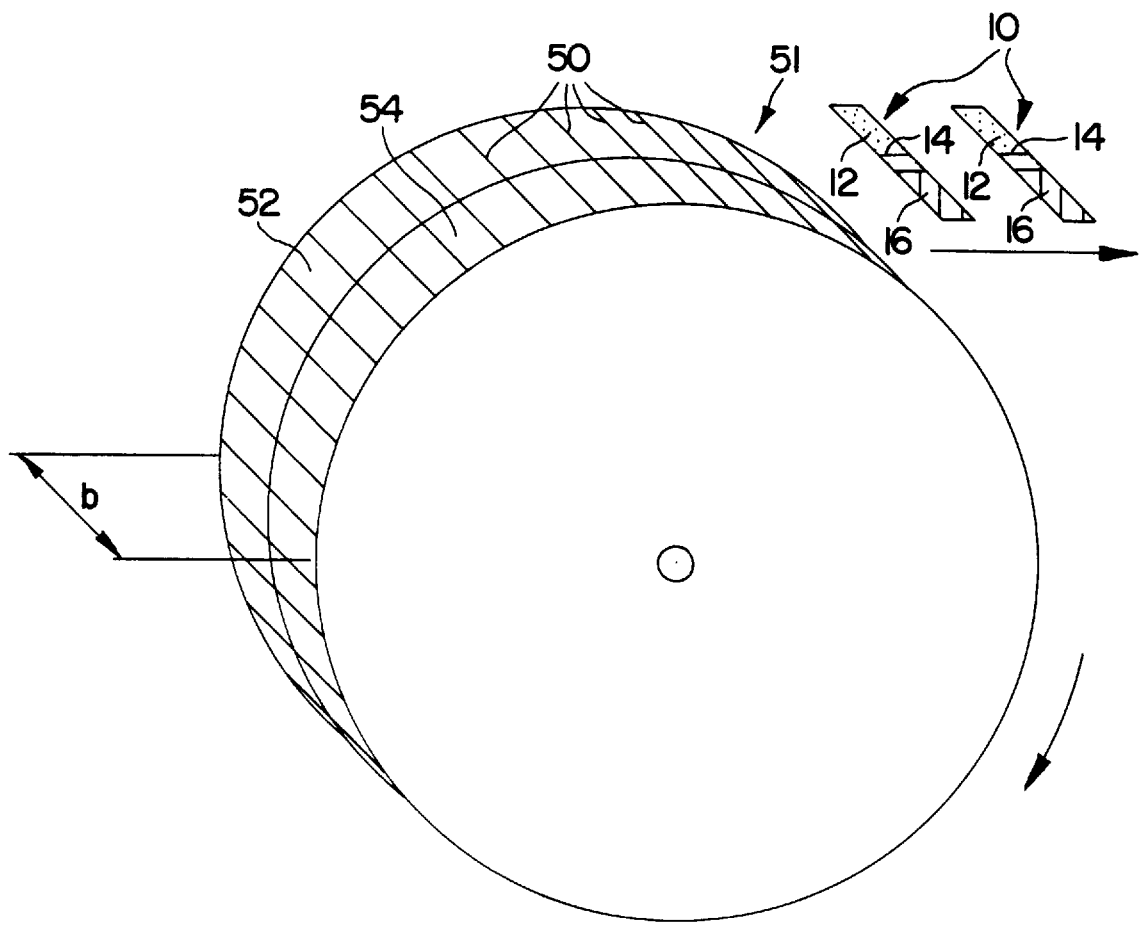
FIG. 6 is a perspective view of a fourth apparatus for making a thermocouple according to the present invention by rapidly solidifying a melted composition in a melt spinning process having adjoining high thermal conductivity and low thermal conductivity cylindrical members.

FIG. 6 is a perspective view of still another apparatus that may be used to manufacture thermocouple 10 according to the present invention by rapidly solidifying a melted composition in a melt spinning process. A molten material held in a crucible (as described above with reference to FIG. 5) is supplied to wheel 51 having width "b" and comprised of first thermal conductivity cylindrical region 52 and second thermal conductivity cylindrical region 54. Regions 52 and 54 are comprised, for example, of materials selected by virtue of their respective heat transfer properties to cause cooling without crystallization of the molten material on first thermal conductivity region 52 and cooling with crystallization of the molten material on second thermal conductivity region 54.

Where the thermal conductivity regions have high thermal conductivity, the molten material will cool into an amorphous state, and where the thermal conductivity regions have low thermal conductivity, the molten material will cool into a crystalline state. Optionally, regions 52 and 54 are comprised of materials selected by virtue of their respective heat transfer properties to cause cooling with crystallization of molten material 40 to one crystallized state (characterized by one set of thermoelectric properties) on second thermal conductivity regions 54, and cooling with crystallization of molten material 40 to another crystallized state (characterized by another set of thermoelectric properties) on first thermal conductivity regions 52.

Gap 50 are formed of a thermal insulation material, a physical separation between the first thermal conductivity region 52 and the second thermal conductivity region 54, by varying the heights of adjacent regions with respect to each other, or by any other configuration that provides a break in continuity between first thermal conductivity region 52 and second thermal conductivity region 54 and allows individual thermocouples 10 to be separated and removed from the cylindrical members by centrifugal force.

As wheel 51 is rotated, the molten material is deposited thereon. The rotation of wheel 51 causes the molten material to cool and rapidly solidify in individual thermocouples separated by gaps 50 causing first solid phase section 12 to form on first thermal conductivity region 52 and second solid phase section 16 to form on second conductivity region 54, with a transition 14 forming therebetween. Optionally, regions 52 and 54, and the molten material thereon may be cooled by a coolant, for example, cooled water, ethylene glycol, liquid nitrogen, or other fluid cooling agent, circulating either internally or externally to regions 52 and 54. Since the molten material does not solidify at gaps 50, thermocouples 10 are individually formed and easily removed from regions 52 and 54 by centrifugal force before thermocouple 10 completes one revolution on wheel 51. By using this apparatus, 1,000 to 10,000 thermocouples may be produced each second.

Figure 7A:
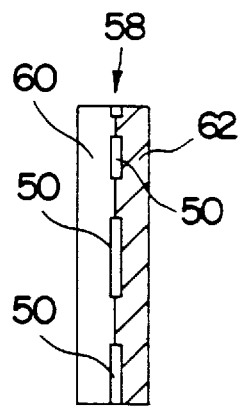
FIG. 7A is an elevational view of a fifth apparatus for making a thermocouple according to the present invention by rapidly solidifying a melted composition in a melt spinning process having adjoining high thermal conductivity and low thermal conductivity members.
Figure 8:
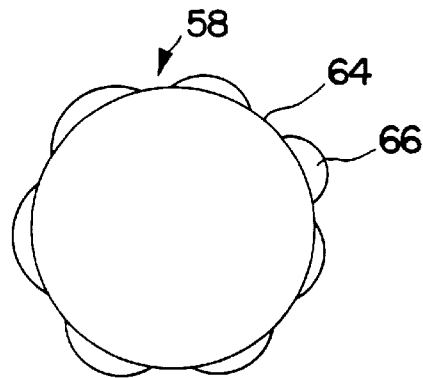
FIG. 8 is a side elevation view of the apparatus shown in FIG. 7A.

FIGS. 7A and 8 are elevation and side views, respectively, of another apparatus that may be used to manufacture thermocouple 68 according to the present invention by rapidly solidifying a melted composition in a melt spinning process. A molten material held in a crucible (as described above with reference to FIG. 5) is supplied to wheel 58 comprised of first thermal conductivity cylindrical region 60, and second thermal conductivity region 62. Wheel 58 further includes at least one gap 50, and preferably a plurality of gaps 50 along adjoining first and second thermal conductivity regions 60 and 62, respectively (see FIG. 7A). Gaps 50 are formed of a thermal insulation material, a physical separation between first thermal conductivity region 60 and second thermal conductivity region 62, by varying the heights of adjacent regions with respect to each other, or by any other configuration that provides a break in continuity between first thermal conductivity region 60 and second thermal conductivity region 62. For example, gap 50 may be a circumferential blade 64 having at least one protrusion 66 such as a radial, pie-shaped tooth or teeth (see FIG. 8) on wheel 58. Regions 60 and 62 are comprised of materials selected by virtue of their respective heat transfer properties to cause cooling without crystallization of the molten material on first thermal conductivity region 60 and cooling with crystallization of the molten material on second thermal conductivity region 62.

Where the thermal conductivity regions have high thermal conductivity, the molten material will cool into an amorphous state, and where the thermal conductivity regions have low thermal conductivity, the molten material will cool into a crystalline state. Optionally, regions 60 and 62 are comprised of materials selected by virtue of their respective heat transfer properties to cause cooling with crystallization of molten material 40 to one crystallized state (characterized by one set of thermoelectric properties) on second thermal conductivity regions 62, and cooling with crystallization of molten material 40 to another crystallized state (characterized by another set of thermoelectric properties) on first thermal conductivity regions 60.

The protrusion 66 of circumferential blade 64 is preferably formed of a material such that the molten material will not solidify thereon.

Figure 7B:
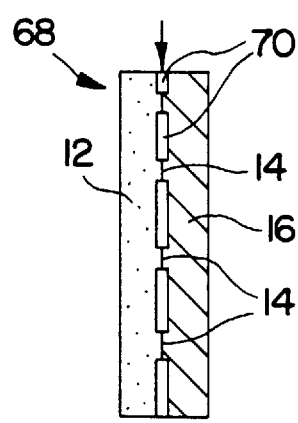
FIG. 7B is an elevational view of a thermocouple produced by the apparatus shown in FIG. 7A.

As wheel 58 is rotated, the molten material is deposited thereon. The rotation of regions 60 and 62 causes the molten material to cool and rapidly solidify in a ribbon of indefinite length forming first solid phase section 12 on first thermal conductivity region 60 and second solid phase section 16 on second thermal conductivity region 62, with a transition 14 therebetween as shown in FIG. 7B. The molten material does not form in the area of gaps 50 or protrusion 66. Optionally, wheel 58 and the molten material thereon may be cooled by a coolant, for example, cooled water, ethylene glycol, liquid nitrogen or other cooling agent, circulating in wheel 58. Since the molten material does not solidify at protrusions 66, thermocouples 68 of indefinite length are formed and easily removed from wheel 58 by centrifugal force before the thermocouple makes one revolution on wheel 58. Thermocouple 68 formed using this apparatus, after being removed from wheel 58 by centrifugal force, may be cut along the line defined by perforation(s) 70 to a suitable length where one transition 14 is left uncut. The now individual first solid phase section 12 and second solid phase section 16 of thermocouple 68 form the legs of thermocouple 68 while the uncut transition 14 functions as the hot junction.

Furthermore, if thermocouples having a length equal to the circumference of wheel 58 are desired, wheel 58 may have only one long protrusion 66. Such a protrusion would extend around most of the circumference of wheel 68, leaving only a small transition 14.

Thermocouples produced on such a wheel would not have to be cut along transition 14. Alternatively, by including only one gap 50 on a wheel 58 as shown in FIG. 6, a thermocouple can be produced having a length equal to the circumference of wheel 58. This thermocouple can then be cut along most of the transition 14 to form leads.

Figure 9:
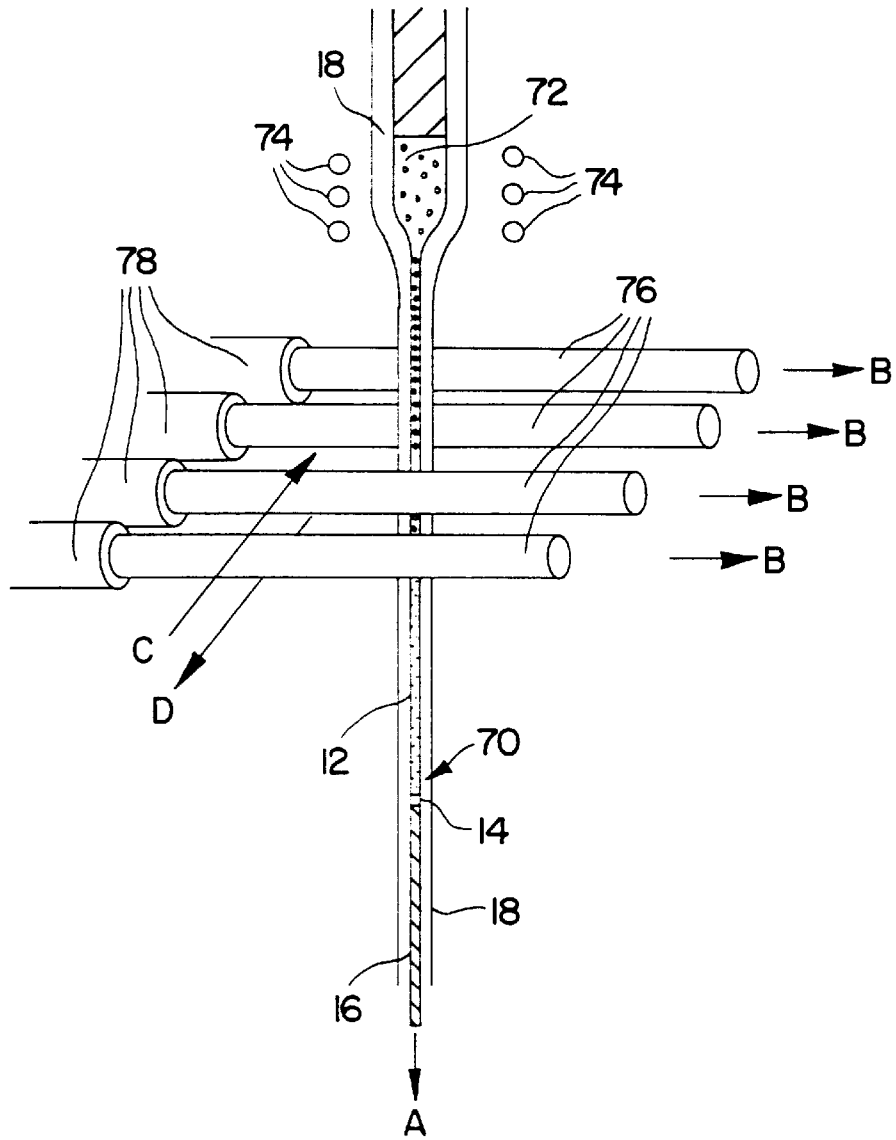
FIG. 9 is perspective view of a sixth apparatus for making a glass coated thermocouple according to the present invention by alternatingly contacting a stream of molten material with at least one fluid coolant stream and air.

FIG. 9 is a perspective view of another apparatus that may be used to manufacture thermocouples 70 according to the invention by cooling a stream of molten metal at varying rates. A metal or metallic alloy composition or other conductive material 72, optionally coated with protective coating 18, is heated by inductance coil 74 (or other suitable heating means) into a molten state. The now molten composition is drawn in a direction indicated by the letter "A" to a cylindrical drum or the like through at least one and preferably a plurality of streams of liquid coolant 76 such as water or oil. Streams of liquid coolant 76 are directed past the molten material in a direction indicated by arrow "B" by at least one and preferably a plurality of nozzles 78. Nozzles 78 move in a translational or rotational movement with respect to the molten material.

As discussed above, the streams of liquid coolant 76 flow in a direction indicated by arrows B while the nozzles 78 move, for example, in a direction indicated by arrows C and D. The temperature and composition of liquid coolant 76 are selected such that when the molten material is contacted by the air surrounding streams of coolant 76, the molten material is transformed into a crystalline state, while when the molten material is contacted and cooled by streams of coolant 76, the molten material is transformed into a amorphous state. Transitions are formed between the amorphous and crystalline states. In this way thermocouples 70 having amorphous first solid phase sections 12, transitions 14, and crystalline second solid phase sections 16 are formed. Optionally, the temperature and composition of liquid coolant 76 is selected such that when the molten material is contacted by coolant 76, the molten material is transformed into a first crystalline state, and when the molten material is contacted by the air surrounding streams of coolant 76, the molten material is transformed into a second crystalline state having thermoelectric properties different from the first crystalline state. In this way thermocouples 70 having crystalline first sections 12, transition 14, and crystalline second sections 16 are formed, where the two crystalline sections have dissimilar thermoelectric properties and a Seebeck Effect is exhibited across transition 14.

The metal or metallic alloy composition or other conductive material 72 and coolant used in cooling streams 76 must be selected such that material 72 will be transformed to a first solid phase by coolant stream 76, and material 72 will be transformed into a second solid phase by the cool air surrounding cooling streams 76.

In addition to the above-described methods and apparatuses, thermocouples may be formed by mechanical force. For example, an initially crystalline length of material may be cold worked to transform a section of the length of material to a new crystalline state having properties different from the initial crystalline state such that a thermoelectric Seebeck Effect is exhibited across the transition from the first crystalline state to the second crystalline state. Cold working generally refers to a process by which the material is plastically deformed at a temperature below the temperature of crystallization of the material. Also, a section of a length of an initially crystalline or amorphous material may be transformed to any crystalline state (if initially amorphous) or any crystalline state different from the initial crystalline state (if initially crystalline) by applying pressure to a section of the initially amorphous or crystalline materials. A thermoelectric Seebeck Effect is exhibited across the transition between the amorphous and crystalline sections, or two crystalline sections. The pressure may be applied by any conventional means.

In each of the above-described embodiments, each successive first solid phase section 12, transition 14 and second solid phase section 16, optionally, may be coated with a chemically resistant glass, plastic, ceramic, or the like protective coating 18 either before or after the thermocouples are formed. Such a coating may be applied by any conventional method including incorporating a coating or extrusion step into the melt spinning processes described with respect to FIGS. 5–8. Also, an amorphous or crystalline wire, ribbon, film or rod conductive material initially may be coated with a glass, plastic, ceramic or the like coating 18 before being processed with the apparatuses shown in FIGS. 3 and 4. Further, the metal or metallic alloy composition or other conductive material initially may have a coating 18 before being heated and drawn as shown in FIG. 9. The apparatuses shown in FIGS. 5–9 allow continuous, inexpensive mass production of thermocouples.

Figure 1:
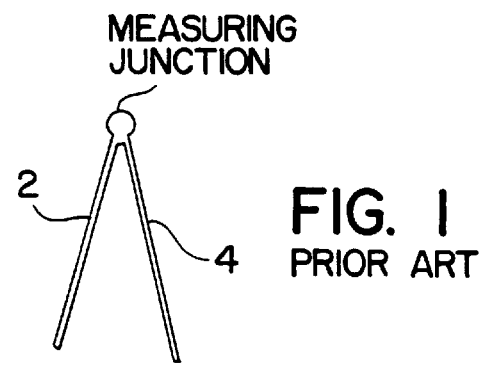
FIG. 1 is a drawing of a prior art thermocouple device.

The thermocouples according to the present invention may be shaped into a bent configuration as shown in FIG. 1 by bending the thermocouple near the transition 14 either on one side or the other of the transition. The thermocouples according to the present invention may be bent such that the thermocouple permanently maintains a bent configuration. Alternatively, the thermocouples may be bent such that the thermocouples return to a straight configuration after the forces causing the bending are released.

Where the thermocouple includes an amorphous section and a crystalline section, the amorphous section may be stabilized in the amorphous state by heating the amorphous section to a temperature above the temperature of the medium to be measured with the thermocouple but below the transition temperature of the material used to form the thermocouple. In this way the thermocouple will be structurally relaxed.

Experimental Results

Thermocouples according to the present invention have been produced from glass coated and bare amorphous metal ribbons and wires formed from iron-based, cobalt-based, and nickel-based alloys using a heat crystallization method as shown in FIG. 3 and described above. Portion 32 of an initially amorphous length of material was resistively heated to crystallize and form second section 16 and transition 14 between amorphous first section 12 and crystalline second section 16 as described above. The glass coated and bare amorphous metal ribbons and wires of the type used in these experiments are commercially available from numerous suppliers. The thermocouples produced had thicknesses or diameters ranging from 1 to 100 micrometers. The output of the thermocouples were measured on a high precision, digital multi-meter Fluke 8840 A/AF having an accuracy of 1 microvolt. A thermoelectric Seebeck Effect was shown across transition 14 due to the different electron structures of first solid phase (amorphous) section 12 and second solid phase (crystalline) section 16. The different electron structures created a voltage difference that was measured across transition 14 when it was heated.

Figure 10:
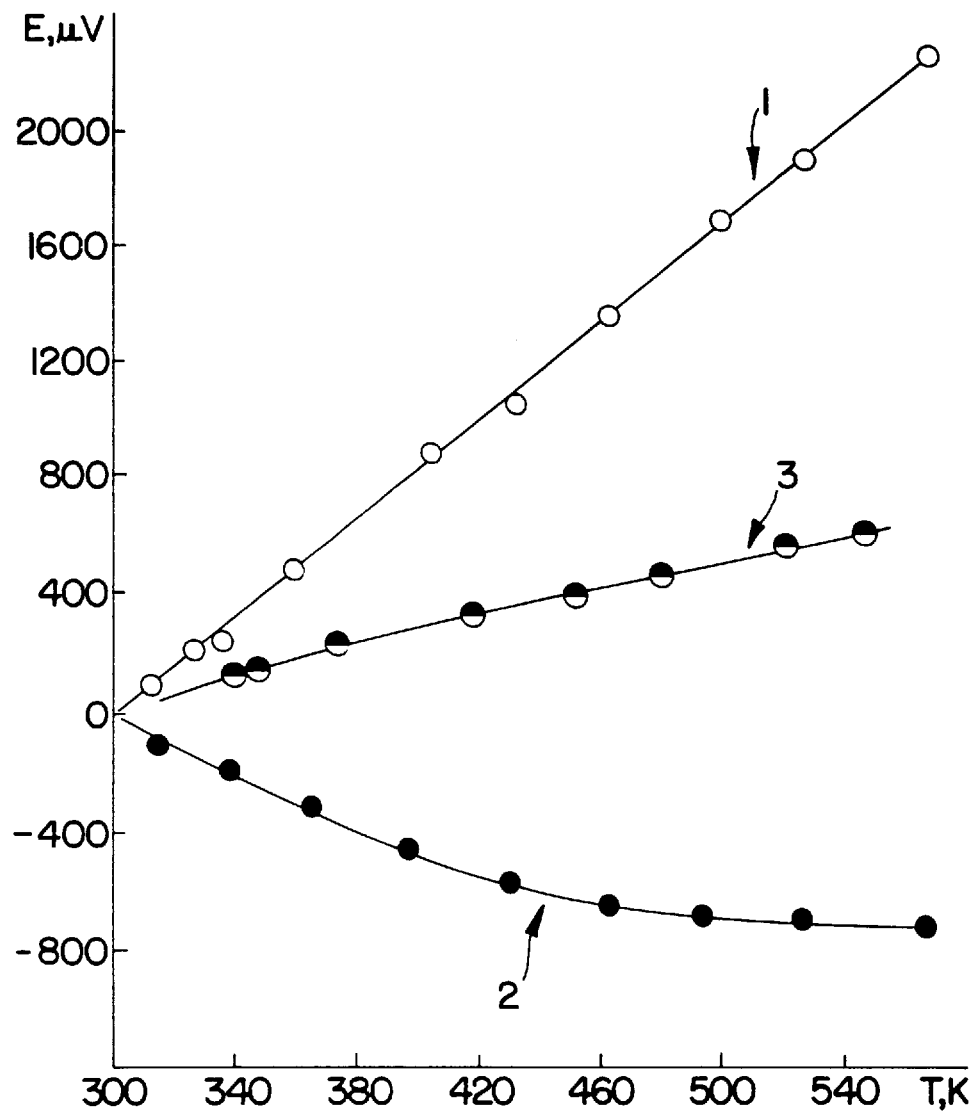
FIG. 10 is a voltage-temperature graph showing the thermoelectric Seebeck Effect across the transition of the two phases of three (3) thermocouples according to the present invention.

FIG. 10 is a graphical representation of the voltage or potential difference across amorphous crystalline transition 14 of three thermocouples produced by the method shown in FIG. 3 as discussed above. The thickness of each being about 10–30 micrometers. The thermocouples tested in this manner were composed of (1) 70 atomic percent cobalt, 5 atomic percent iron, 10 atomic percent silicon, and 15 atomic percent boron; (2) 84 atomic percent iron and 16 atomic percent boron; and (3) 53 atomic percent nickel, 19 atomic percent iron, 8 atomic percent silicon, and 20 atomic percent boron for which the respective temperature response curves 1, 2 and 3, respectively, are shown in FIG. 10.

For example, the above-described cobalt-based and nickel-based thermocouples exhibited a positive potential difference (curves 1 and 3, respectively) as temperature increased when first solid phase (amorphous) section 12 was attached to the positive terminal of the multi-meter and second solid phase (crystalline) section 16 was attached to the negative terminal of the multi-meter, while the above-described iron-based thermocouple exhibited a negative potential difference (curve 2) as temperature increased when first solid phase (amorphous) section 12 was attached to the positive terminal of the multi-meter and second solid phase (crystalline) section 16 was attached to the negative terminal of the multi-meter, while the above-described iron-based thermocouple exhibited negative potential differences (curve 2) as temperature increased when first solid phase (amorphous) section 12 was attached to the positive terminal of the multi-meter and second solid phase (crystalline) section 16 was attached to the negative terminal of the multimeter. As reflected by the slope of curve 1, the cobalt-based thermocouple achieved an output of 8.1 micro-volts per Kelvin degree which was constant over the temperature range of about 293 to about 593 Kelvin degrees. Also, as illustrated by curve 1, the thermocouples of the present invention showed thermoelectric power corresponding to thermocouples of conventional S-type (platinum-based) thermocouples.

While the present invention has been described with respect to particular embodiments and examples, it is not limited thereto. It should be expected that various other embodiments, examples and modifications thereof will be apparent to those skilled in the art, without departing from the true spirit and scope of this invention. Accordingly, it is intended that the scope of the claims appended hereto not be limited to the description as set forth herein but rather to encompass all such embodiments and modifications which include any one or more of the features of patentable novelty discussed and claimed herein.

What is claimed:

1. A thermocouple comprising:

a length of material of a single chemical composition, said length having two sections;

a first solid phase section; and a second solid phase section;

said sections adjoining one another to form a continuous transition, wherein said transition is capable of experiencing a Seebeck Effect; and wherein said first solid phase is amorphous and said second solid phase is crystalline.

2. The thermocouple according to claim 1, wherein said length of material has a minimum thickness or diameter in the range about 1 to 100 micrometers.

3. The thermocouple according to claim 1, wherein said composition is selected from the group consisting of cobalt-based, iron-base, and nickel-based alloys.

4. The thermocouple according to claim 1, wherein said thermocouple further comprises a protective coating surrounding said thermocouple.

5. The thermocouple according to claim 4, wherein said protective coating is chemically resistant.

6. A method of measuring temperature comprising measuring a potential difference across the thermocouple of claim 1.

7. A thermocouple formed from a length of material of a single chemical composition, said thermocouple comprising a first solid phase section, and a second solid phase section and a continuous transition therebetween produced in accordance with the following method supplying a length of said material which is in a first solid phase;

raising the temperature of a first section of said length of material above a transformation temperature of said composition for a time sufficient to transform said composition to a second solid phase while maintaining the temperature of a second section of said length of material adjoining said first section below said transformation temperature, wherein said transition is capable of experiencing a Seebeck Effect, and said first solid phase is amorphous and said second solid phase is crystalline.

8. A thermocouple formed from a single chemical composition, said thermocouple comprising a first solid phase section, a second solid phase section and a continuous transition therebetween produced in accordance with the following method continuously causing a stream of a molten material of a single composition to contact a moving substrate, said substrate comprising adjoining regions of first and second thermal conductivities; and cooling and solidifying a length of said molten stream by contact with said moving substrate, said cooling occurring at different rates in said first and second thermal conductivity regions to form at least a first portion of said composition in a first solid phase on said first thermal conductivity region and at least one second portion of said composition in a second solid phase on said second thermal conductivity region and at least one continuous transition therebetween, wherein said transition is capable of experiencing a Seebeck Effect, and wherein said first solid phase is amorphous and said second solid phase is crystalline.

9. A thermocouple formed from a single chemical composition, said thermocouple comprising a first solid phase section, a second solid phase section and a continuous transition therebetween produced in accordance with the following method continuously causing a stream of a molten material of a single composition alternately to contact at least one fluid stream and ambient air surrounding said fluid stream, cooling and solidifying portions of a length of molten material at different rates by contact with said fluid stream and air to form at least one first portion of a first solid phase when said molten material is in contact with said fluid stream and at least one second portion of a second solid phase when said molten material is in contact with said air and at least one continuous transition therebetween, wherein said transition is capable of experiencing a Seebeck Effect, and wherein said first solid phase is amorphous and said second solid phase is crystalline.

* * * * *

UNITED STATES PATENT AND TRADE MARK OFFICE
CERTIFICATE OF CORRECTION

PATENT NO.   : 5,808,233
DATED        : September 15, 1998
INVENTOR(S)  : Mikhail V. Finkel, Jim J. S. Chen, and Antonio M. Goncalves It is certified that error appears in the above-identified patent and that said Letters Patent is hereby corrected as shown below:

On title page, section [75], delete "Antonio M. Goncalves, Elkins Park".

On title page, of the patent, section "[56]", under "Other Publications", in the last line of the "Valvano" publication, delete "pp. 357-437" and insert therefor --pp. 359-437--.

At column 1, line 17, after "2", delete "to".

At column 3, line 27, after "having", insert --a--.

At column 3, line 67, after "alloy", insert --and--.

At column 4, line 38, after "length of", insert --material--.

At column 4, line 50, after "which", insert --the--.

At column 5, line 50, after "length", insert --of--.

At column 6, line 23, after "be", insert --thermodynamically--.

At column 10, line 22, after "having", insert --thermoelectric--.

At column 12, line 24, after "range", insert --of--.

At column 12, line 27, delete "iron-base" and insert therefor --iron-based--.

UNITED STATES PATENT AND TRADE MARK OFFICE
CERTIFICATE OF CORRECTION

PATENT NO. : 5,808,233
DATED : September 15, 1998
INVENTOR(S) : Mikhail V. Finkel, Jim J. S. Chen, and Antonio M. Goncalves It is certified that error appears in the above-identified patent and that said Letters Patent is hereby corrected as shown below:

At column 12, line 59, end the first paragraph of claim 8 with "method"; and begin the first subparagraph of claim 8 with "continuously"

Signed and Sealed this

Fifth Day of October, 1999

Attest:

Attesting Officer

Q. TODD DICKINSON

Acting Commissioner of Patents and Trademarks